UNITED STATES PATENT OFFICE.

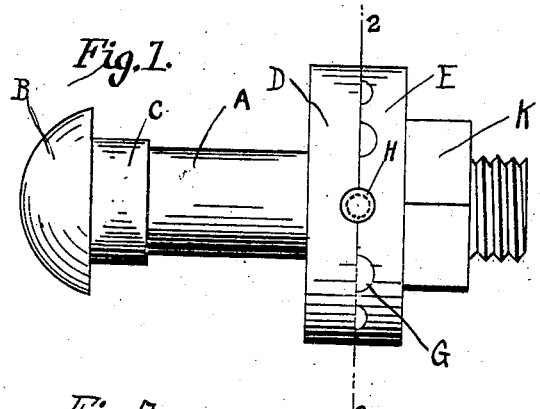
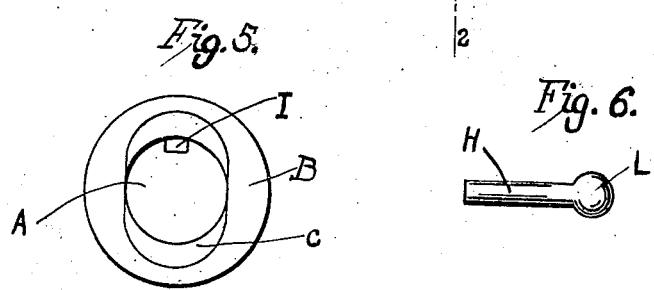
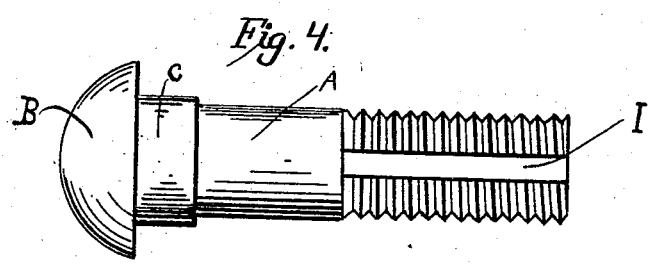
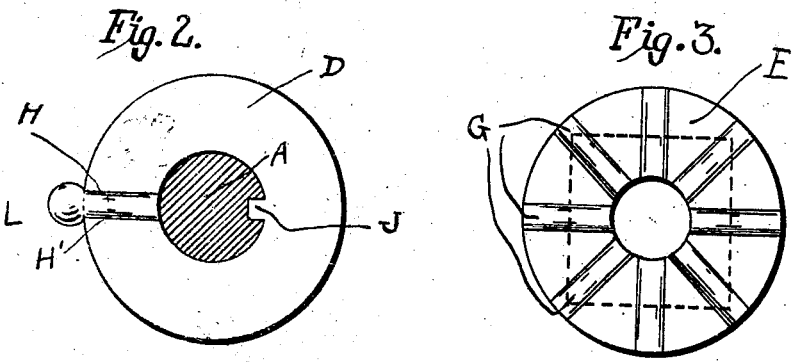
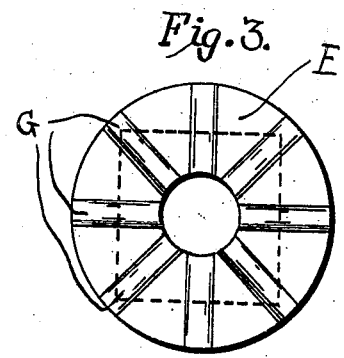

WILLIAM H. REIGHARD, OF AKRON, OHIO.

NUT OR BOLT LOCKING DEVICE.

1,061,125.  Specification of Letters Patent.  Patented May 6, 1913.

Application filed November 30, 1912. Serial No. 734,363.

*To all whom it may concern:*

Be it known that I, WILLIAM H. REIGHARD, a citizen of the United States, residing at Akron, in the county of Summit and State of Ohio, have invented certain new and useful Improvements in Nut or Bolt Locking Devices; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in nut and bolt locking devices and it has for its object the provision of a simple, inexpensive and practical device of this character, which will serve to securely lock the nuts upon the bolts and prevent the possibility of rotating the same until released by the removal of a locking pin.

To these ends and such others as the invention may pertain, the same consists in the novel construction and the peculiar arrangement, combination and adaptation of parts, all as will be more fully hereinafter described, shown in the accompanying drawings, and then specifically defined in the appended claim.

The invention is clearly illustrated in the appended drawings which, with the letters of reference marked thereon form a part of this specification and in which drawings:—

Figure 1 is a side elevation of a nut and bolt locking device constructed in accordance with my invention. Fig. 2 is a plan view of the washer taken upon line 2—2 of Fig. 1. Fig. 3 is a bottom plan view of the nut or bur. Fig. 4 is a side elevation of the bolt with the nut and washer removed. Fig. 5 is an end view of the same, and Fig. 6 is a side elevation of the locking pin.

Reference now being had to the details of the drawings by letter, A represents a bolt of ordinary construction, having one of its ends provided with an enlargement or head, and a portion C adjacent to the head, but of slightly less diameter. The opposite end of the bolt is screw-threaded as shown.

D is a washer or disk the said washer having a central opening A′, the bottom of which opening corresponds with the diameter of the body portion A of the bolt upon which it is designed to be sleeved, said opening being provided at one of its edge sides with an inwardly extending lug J, adapted with the washer sleeved upon the bolt to engage the longitudinal slot I therein and the said disk upon one of its faces and positioned diametrically opposite of the lug J with a radial channel or groove to receive the locking pin H.

E is the enlarged inner end of the nut or bur K which is screw-threaded to engage the screw-threaded end of the bolt, the said nut upon its inner face is provided with a series of radial grooves or channels G extending from the central opening of the bolt to the circumference of the disk and H is a locking key designed for locking the nut to the disk upon the bolt.

From the foregoing description the operation of the device will be at once readily understood. The disk D is placed over the screw-threaded end of the bolt and is moved at the point at which it is desired to secure it. The nut or bur K is screwed upon the bolt until the grooved face of the enlarged portion of the bolt is brought into contact with the grooved face of the disk and is then turned until the groove H provided upon the meeting face of the disk is caused to register with one of the radial grooves G upon the face of the bur. When the locking pin H is inserted within the opening H′ formed by the grooves in the meeting face of the disk and the nut or bur respectively, the parts are thus securely locked against rotation. The locking pin is provided with an enlarged portion or head L which serves to permit the pin to be withdrawn from its locking position when it is desired to release or tighten the nut upon the bolt.

Having thus described my invention what I claim and desire to secure by Letters Patent is:—

A nut lock comprising a bolt having a longitudinal groove formed transversely of the threads of the bolt, a disk with a central aperture having a lug projecting from the marginal edge thereof and adapted to engage said groove in the bolt, said disk having a radial groove extending from its central opening to the circumference thereof, a bolt with threaded opening for engagement with the threads of the bolt, the inner face of said bolt having radial grooves adapted to register with the groove in said disk, and a key adapted to engage registering grooves in said disk and nut to hold the latter from rotation, as set forth.

In testimony whereof I hereunto affixed my signature in the presence of two witnesses.

WILLIAM H. REIGHARD.

Witnesses:
SIGNE S. ERICKSON,
ARTHUR SHARP.

Copies of this patent may be obtained for five cents each, by addressing the "Commissioner of Patents, Washington, D. C."